US010152133B2

(12) United States Patent
Lim

(10) Patent No.: US 10,152,133 B2
(45) Date of Patent: Dec. 11, 2018

(54) APPARATUS AND METHOD FOR PROVIDING IMAGE

(71) Applicant: Electronics and Telecommunications Research Institute, Daejeon (KR)

(72) Inventor: Jeong Mook Lim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/447,008

(22) Filed: Mar. 1, 2017

(65) Prior Publication Data

US 2017/0262058 A1 Sep. 14, 2017

(30) Foreign Application Priority Data

Mar. 11, 2016 (KR) .................. 10-2016-0029661

(51) Int. Cl.
| | |
|---|---|
| G06F 3/041 | (2006.01) |
| G06F 3/01 | (2006.01) |
| G06T 7/44 | (2017.01) |
| G06T 7/11 | (2017.01) |
| G06K 9/46 | (2006.01) |
| G06K 9/62 | (2006.01) |
| G06F 3/0488 | (2013.01) |
| G06F 3/0484 | (2013.01) |
| G09B 21/00 | (2006.01) |

(52) U.S. Cl.
CPC .............. G06F 3/016 (2013.01); G06F 3/041 (2013.01); G06F 3/04845 (2013.01); G06F 3/04886 (2013.01); G06K 9/4604 (2013.01); G06K 9/6218 (2013.01); G06T 7/11 (2017.01); *G06T 7/44* (2017.01); *G09B 21/003* (2013.01); *G06F 2203/014* (2013.01)

(58) Field of Classification Search
USPC .......... 345/173, 174, 156; 382/103; 285/390
See application file for complete search history.

(56) References Cited

U.S. PATENT DOCUMENTS

| | | | |
|---|---|---|---|
| 7,982,720 B2 | 7/2011 | Rosenberg et al. | |
| 8,890,667 B2 | 11/2014 | Lim et al. | |
| 8,996,246 B2 | 3/2015 | Kim | |
| 9,658,596 B2* | 5/2017 | Han | G03H 1/08 |
| | | | 345/156 |
| 2007/0035511 A1* | 2/2007 | Banerjee | G06F 3/011 |
| | | | 345/156 |
| 2014/0049491 A1* | 2/2014 | Nagar | G06F 3/016 |
| | | | 345/173 |

(Continued)

FOREIGN PATENT DOCUMENTS

| | | |
|---|---|---|
| EP | 2 624 099 A1 | 8/2013 |
| KR | 10-2012-0021000 A | 3/2012 |

(Continued)

*Primary Examiner* — Thuy Pardo

(57) ABSTRACT

Provided is a method of providing an image, the method including obtaining an image, extracting a haptic feature from an edge of the obtained image, generating a vibration pattern signal corresponding to the extracted haptic feature based on vibration pattern data, and generating vibration corresponding to a vibration generation request according to the generated vibration pattern signal when there is the vibration generation request.

11 Claims, 5 Drawing Sheets

(56) References Cited

U.S. PATENT DOCUMENTS

| | | | |
|---|---|---|---|
| 2014/0062927 A1* | 3/2014 | Hirose | G06F 3/016 345/173 |
| 2014/0071117 A1* | 3/2014 | Schuckle | G06F 3/016 345/419 |
| 2014/0168111 A1* | 6/2014 | Mohammed | G06F 3/016 345/173 |
| 2014/0168114 A1* | 6/2014 | Mohammed | G06F 3/016 345/173 |
| 2014/0313142 A1* | 10/2014 | Yairi | G06F 3/016 345/173 |
| 2015/0145657 A1 | 5/2015 | Levesque et al. | |
| 2015/0146925 A1* | 5/2015 | Son | G06K 9/00624 382/103 |
| 2015/0227206 A1* | 8/2015 | Schuckle | G06F 3/016 345/173 |
| 2016/0131912 A1* | 5/2016 | Border | G02B 27/0176 345/8 |
| 2016/0146381 A1* | 5/2016 | Martin | E21B 17/042 285/390 |
| 2016/0246381 A1* | 8/2016 | Schuckle | G06F 3/016 345/173 |
| 2018/0045967 A1* | 2/2018 | Osterhout | G06F 3/03547 345/173 |

FOREIGN PATENT DOCUMENTS

| | | |
|---|---|---|
| KR | 10-2013-0090299 A | 8/2013 |
| KR | 10-2015-0060575 A | 6/2015 |

* cited by examiner

APPARATUS AND METHOD FOR PROVIDING IMAGE

CROSS-REFERENCE TO RELATED APPLICATIONS

This U.S. non-provisional patent application claims priority under 35 U.S.C. § 119 of Korean Patent Application No. 10-2016-0029661, filed on Mar. 11, 2016, the entire contents of which are hereby incorporated by reference.

BACKGROUND

The present disclosure herein relates to a technology for expressing an image by using haptic sensation, and more particularly, to a technology for enabling an image identified through a sense of sight to be identified by haptic sensation, such as vibration.

Haptic feedback expressed by vibration may be provided to a user along with visual and auditory feedback to enable the user to enjoy an image, video, audio or the like to have a higher-quality user experience. In recent, devices, such as a mobile device, touch screen device and personal computer include a separate actuator for generating haptic effects, haptic effect generation software or the like. In general, a typical haptic effect (a sense of button) is pre-programmed and called by a user as needed to actuate embedded hardware (actuator or the like) that may generate a haptic effect. Such a technique may be equally applied to multimedia content, such as audio or video content and in general, haptic information to be output is included in a multimedia content file and the pre-programmed haptic effect is output according to a time axis when playback is performed. In the case of an audio file, a technique that analyzes the property of a sound output when playback is performed, without changing an existing file and converts the sound into vibration has been introduced. In the case of image content, it is possible to pre-produce haptic data in a similar method to that of the audio content and perform output by the pre-produced haptic data when a user touches an image in order to output an actual image file. However, in a case where the haptic data is added to the image content in such a manner, there is a drawback that existing image content should be modified. Also, there is a drawback that the size of the image content increases, because the higher the quality of the haptic data is, an amount of information increases.

SUMMARY

The present disclosure provides a technology to express, by using haptic sensation, a color, the quality of a material or the like included in an image that is visual content.

An embodiment of the inventive concept provides a method of providing an image, the method including obtaining an image; extracting a haptic feature from an edge of the obtained image; generating a vibration pattern signal corresponding to the extracted haptic feature based on vibration pattern data; and generating vibration corresponding to a vibration generation request according to the generated vibration pattern signal when there is the vibration generation request.

In an embodiment of the inventive concept, an apparatus for providing an image includes an image obtainment unit configured to obtain an image; a haptic feature extraction unit configured to extract a haptic feature from an edge of the obtained image; a vibration pattern signal generation unit configured to generate a vibration pattern signal corresponding to the extracted haptic feature based on vibration pattern data; and a vibration generation unit configured to generate vibration corresponding to a vibration generation request according to the generated vibration pattern signal when the vibration generation request is obtained.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
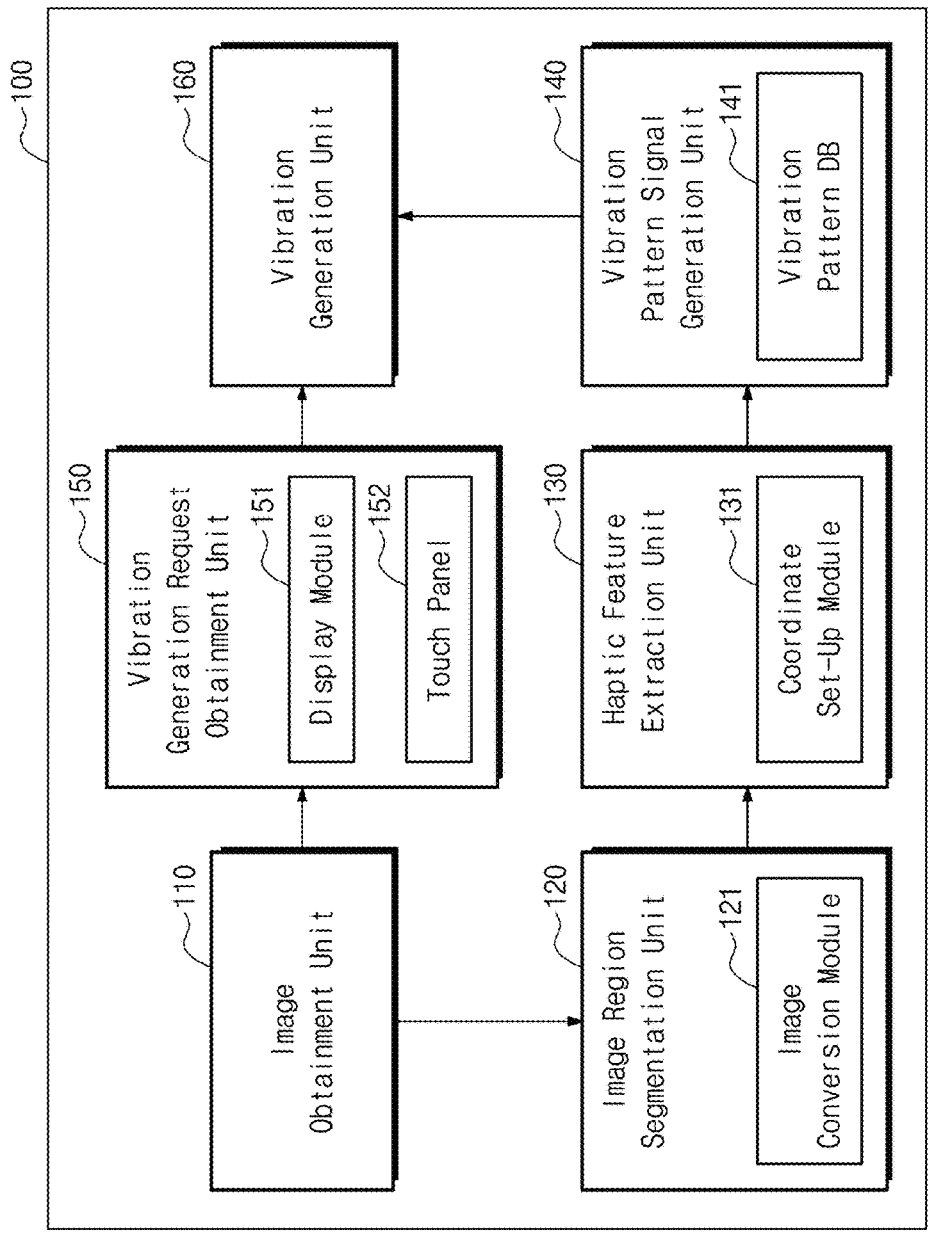
FIG. 1 is a block diagram of an image providing apparatus according to an embodiment of the inventive concept.

Since the inventive concept may make various changes and have many embodiments, particular embodiments will be illustrated in the drawings and described in detail in the detailed description. However, inventors do not intend to limit the inventive concept to particular embodiments and it should be understood that the inventive concept covers all changes, equivalents and replacements that fall within the spirit and technical scope of the inventive concept. In describing the inventive concept, detailed descriptions related to well-known functions or configurations will be ruled out in a case where it is considered that they unnecessarily obscure subject matters of the inventive concept. Also, a singular form used in the specification and claims should be construed to mean "a plural form" unless referred to the contrary.

In the following, the exemplary embodiments of the inventive concept are described in detail with reference to the accompanying drawings, and in describing the embodiments with reference to the accompanying drawings, the same or similar components have the same reference numerals and repetitive descriptions on them are ruled out.

FIG. 1 is a block diagram of an image providing apparatus according to an embodiment of the inventive concept.

Referring to FIG. 1, an image providing apparatus 100 includes an image obtainment unit 110, an image region segmentation unit 120, a haptic feature extraction unit 130, a vibration pattern signal generation unit 140, and a vibration generation request obtainment unit 150.

The image obtainment unit 110 obtains an image for providing to a user by using haptic sensation.

The image region segmentation unit 120 segments a region of the obtained image. In particular, the image region segmentation unit 120 segments an image into a plurality of regions in order to increase accuracy in providing an image.

In an embodiment, the image region segmentation unit 120 may segment the region of the obtained image to a preset size.

In an embodiment, the image region segmentation unit 120 may segment the region of the image based on the density of an edge. In particular, the image region segmentation unit 120 performs edge detection on the obtained image in order to express the density of the edge, and segments the region of the obtained image based on the density of the detected edge. For example, it is possible to divide the density of the edge into 256 ranges and segment the region of the edge for each range.

In an embodiment, the image region segmentation unit 120 may include an image conversion module 121 converting the obtained image into another type of image in order to segment the obtained image. For example, the image conversion module 121 may convert the obtained image into an image expressed by an edge.

The haptic feature extraction unit 130 extracts a haptic feature from the obtained image. Here, the haptic feature means a color, texture, the quality of a material, light and shade, depth, light and shade, temperature or the like that a human being may visually recognize from an image.

In an embodiment, the haptic feature extraction unit 130 may include a coordinate set-up module 131. The coordinate set-up module 131 sets a coordinate system on the obtained image. The haptic feature extraction unit 130 extracts a haptic feature from a region of an image corresponding to each coordinate of the set coordinate system.

In an embodiment, the haptic feature extraction unit 130 may extract a haptic feature from each region segmented by the image region segmentation unit 120.

The vibration pattern signal generation unit 140 generates a vibration pattern signal. In particular, the vibration pattern signal generation unit 140 generates vibration pattern signals corresponding to each haptic feature extracted from the obtained image based on vibration pattern data. Here, the vibration pattern data means vibration patterns depending on the type, size or the like of the haptic feature. The vibration pattern means a pattern obtained by combining the intensity, period, sustainment time or the like of vibration. The vibration pattern signal means a signal that is obtained to a vibration generation unit 160 and needed for the vibration generation unit 160 to generate vibration.

In an embodiment, the vibration pattern signal generation unit 140 may include a vibration pattern DB 141 that stores vibration pattern data. Also, the vibration pattern DB 141 may store the generated vibration pattern signals.

In an embodiment, the vibration pattern signal generation unit 140 may perform cognitive learning targeting a user, and use the vibration pattern generated based on a result of the cognitive learning to generate vibration pattern data. That is, the vibration pattern signal generation unit 140 may learn a haptic feature recognized by a user through a vibration pattern, and generate a vibration pattern based on a result of learning. For example, the vibration pattern signal generation unit 140 may learn a difference in the density of an edge recognized by a user through a vibration pattern, and generate a vibration pattern based on a result of learning. Also, the vibration pattern signal generation unit 140 generates vibration pattern data according to a vibration pattern that is obtained directly by a user for a specific haptic feature. Also, the vibration pattern signal generation unit 140 may generate a profile that stores a vibration pattern generated for each user who has performed cognitive learning.

In an embodiment, the vibration pattern signal generation unit 140 may generate a vibration pattern signal corresponding to a haptic feature extracted from an obtained image, according to a vibration pattern according to the type, size or the like of a preset vibration pattern. For example, the vibration pattern signal generation unit 140 may generate a vibration pattern signal corresponding to the density of an edge extracted from an obtained image in a case where different vibration patterns are set for each density range of an edge.

The vibration generation request obtainment unit 150 obtains a vibration generation request relating to an obtained image. Here, the vibration generation request means a vibration generation request relating to a specific region of an obtained image.

In an embodiment, the vibration generation request obtainment unit 150 may include a display module 151 for outputting an obtained image and a touch panel 152 for obtaining a touch input from a user. For example, the vibration generation request may be performed in such a manner that a user touches a specific region of an image displayed on the display module 151.

The vibration generation unit 160 generates vibration according to a vibration pattern signal. The vibration generation unit 160 generates vibration according to a vibration pattern signal corresponding to information on a region of an image included in a vibration generation request. The vibration generation unit 160 may be implemented in various haptic devices. The vibration generation unit 160 may use vibration, static, ultrasound, friction or the like to generate a haptic effect.

In an embodiment, the vibration generation unit 160 may include at least one of actuators, e.g., an electromagnetic actuator, such as eccentric rotation mass (ERM) that eccentric mass is moved by a motor, a linear resonant actuator (LRA) in which mass that is added to a spring is driven back and forth, a piezo material, a "smart material", such as electro-active polymer or memory shape alloy, a macro-conjugate fiber actuator, a static actuator, an electro-haptic actuator, an actuator that provides physical feedback, such as vibration haptic feedback.

Figure 2:
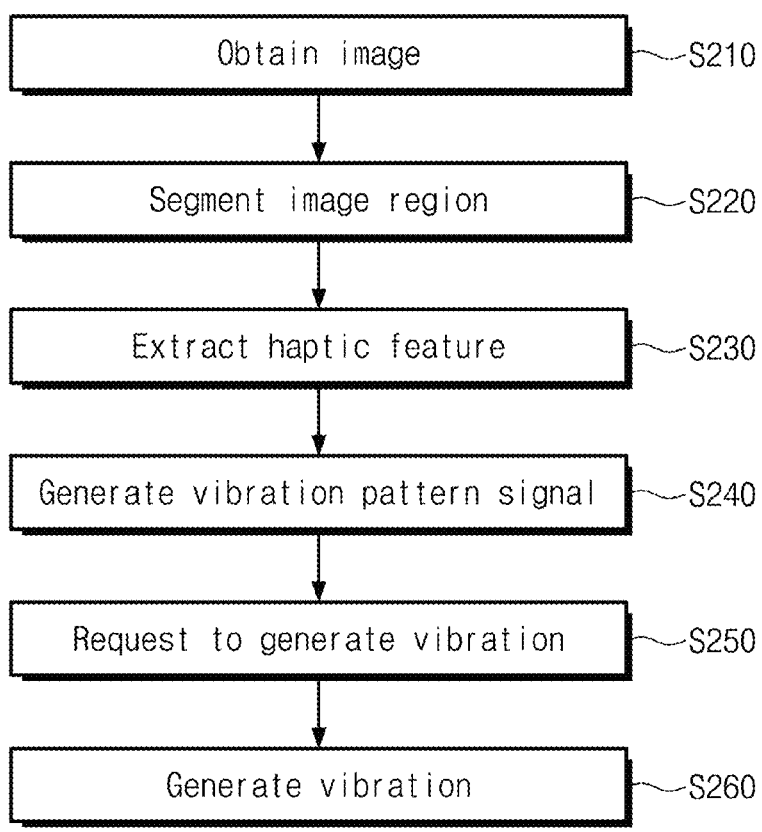
FIG. 2 is a flow chart of an image providing method according to an embodiment of the inventive concept.

FIG. 2 is a flow chart of an image providing method according to an embodiment of the inventive concept. In the following, the image providing method is performed by e.g., the image providing apparatus 100 shown in FIG. 1.

Referring to FIG. 2, the image providing apparatus 100 obtains an image in step S210.

In step S220, the image region segmentation unit 100 segments a region of the obtained image. In particular, the image providing apparatus 100 may segment the obtained image based on a preset size, the density of an edge or the like.

In step S230, the image region segmentation unit 100 extracts a haptic feature from the obtained image. According to an embodiment, the image providing apparatus 100 may extract the haptic feature from each segmented region of the obtained image.

In step S240, the image region segmentation unit 100 generates a vibration pattern signal. In particular, the image providing apparatus 100 generates a vibration pattern signal corresponding to the haptic feature extracted from the obtained image.

In step S250, the image providing apparatus 100 obtains a vibration generation request. In particular, the image providing apparatus 100 outputs the obtained image to a display unit, and obtains, from a user, a vibration generation request corresponding to touching a specific region of the output image.

In step S260, the image providing apparatus 100 generates vibration according to the obtained vibration generation request. In particular, the image providing apparatus 100 generates vibration according to a vibration pattern signal corresponding to a region of an image that is included in the obtained vibration generation request.

Figure 3:
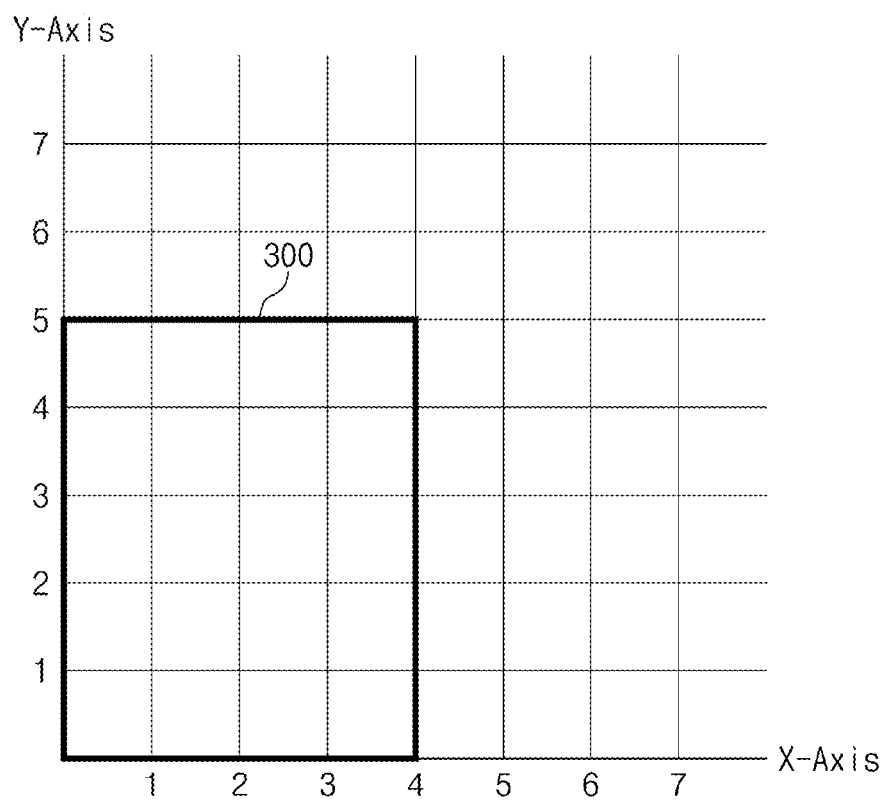
FIG. 3 is a diagram for describing the setting of a coordinate system of an obtained image according to an embodiment of the inventive concept.

FIG. 3 is a diagram for describing the setting of a coordinate system of an obtained image according to an embodiment of the inventive concept.

Referring to FIG. 3, the image providing apparatus 100 sets a 2D coordinate system including x-axis and y-axis on the obtained image. If the coordinate system is set, the image providing apparatus 100 extracts a haptic feature from a region of each coordinate (0,0), (1,1), (1, 2), (1, 3), (1, 4), (2,1), (2, 2), (2,3), (2,4), (3,1), (3,2), (3,3), (3,4), (4, 0), (4,1), (4,2), (4,3), (4,4), (5, 0), (5,1), (5,2), (5,3), or (5,4) of the set coordinate system. The image providing apparatus 100 generates a vibration pattern signal corresponding to the haptic feature extracted from each coordinate. When the touch of at least one of the coordinates is obtained from a user, the image providing apparatus 100 generates vibration according to a vibration pattern signal corresponding to a corresponding coordinate.

Figure 4:
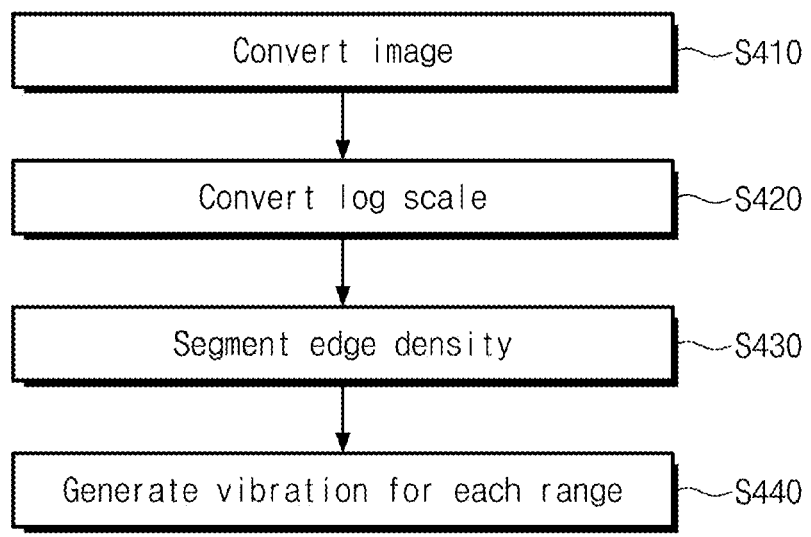
FIG. 4 is a flow chart of a method of generating a vibration pattern signal based on the density of an edge according to an embodiment of the inventive concept.

FIG. 4 is a flow chart of a method of generating a vibration pattern signal based on the density of an edge according to an embodiment of the inventive concept.

Referring to FIG. 4, the image providing apparatus 100 converts an obtained image into an image expressing the density of an edge in step S410.

In step S420, the image providing apparatus 100 performs log scale conversion on the density of the edge. In particular, the image providing apparatus 100 converts the density 256 steps of an edge into a log scale. This is because the stimulus cognition feature of a human being follows a log scale.

In step S430, the image providing apparatus 100 equally segments the density 256 ranges of the edge converted into the log scale at a certain interval. The total density range of the edge expressed by log is 0 to 2.4082, but the image providing apparatus 100 may divide the range of a result value obtained through an actual edge detection algorithm into n equal parts. This is because the density of an edge may be concentrated in a specific range, according to the feature of a filter for edge detection. At this point, the value of n is smaller than or equal to the number of stimuli that a user may differently cognize when the user cognizes haptic stimulus with his or her finger tip. In general, it is known that a human being cognizes variations in amplitude and frequency in such a manner that amplitude or frequency also follows a value that is obtained by changing each size into a log scale. Thus, it is desirable to map the density range of an edge to n haptic stimuli.

In step S440, the image providing apparatus 100 generates a vibration pattern for each converted density range of an edge of a segmented log scale. In the following description, it is assumed that the vibration pattern is a combination of waveform, frequency, vibration and vibration time and may be set in ranges of waveform {sine wave, square wave}, frequency {about 30 Hz to about 200 Hz}, amplitude (vpp) {0 kV to about 2 kV}, and vibration time {time for which a touch screen is touched}. In the case of the waveform, the waveform is set to a sine wave when the converted density range of an edge is high density range, and it is set to a square wave when the converted density range of the edge is low density range. In the case of the frequency, the frequency is set to a high frequency when the converted density range of an edge is high density range, and it is set to a low frequency when the converted density range of the edge is low density range. At this point, a maximum frequency value in a range obtained by equally dividing a value that is obtained by converting a settable frequency range into a log scale is used for a frequency range. In the case of the amplitude, the amplitude is set to a low amplitude when the converted density range of an edge is high density range, and it is set to a high amplitude when the converted density range of the edge is low density range. At this point, a maximum amplitude value in a range obtained by equally dividing a value that is obtained by converting a settable amplitude range into a log scale is used for an amplitude range.

FIGS. 5A to 5D are diagrams for describing the segmentation of the region of an image according to the density of an edge according to an embodiment of the inventive concept.

Figure 5A:
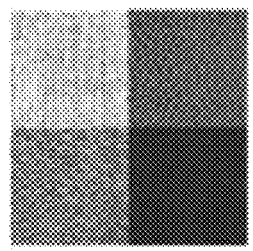
FIG. 5A, FIG. 5B, FIG. 5C, and FIG. 5D are diagrams for describing the segmentation of the region of an image according to the density of an edge according to an embodiment of the inventive concept.
Figure 5B:
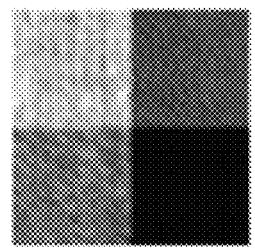
Figure 5C:
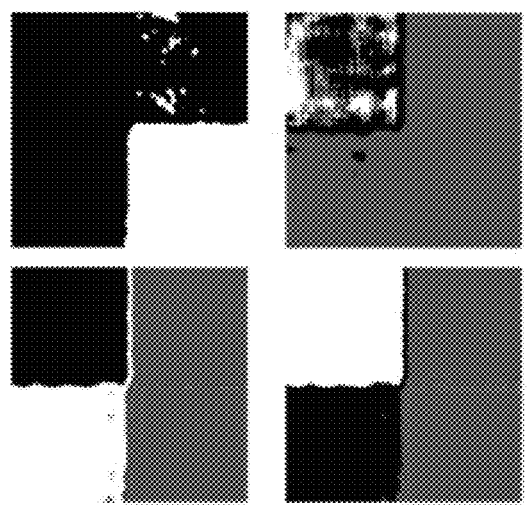
Figure 5D:
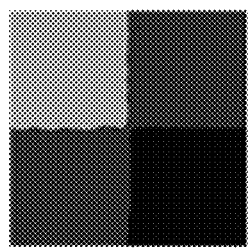

Referring to FIG. 5A, FIG. 5A is a diagram that represents an obtained image. The obtained image is made up of four different textures as shown in FIG. 5A. FIG. 5B is a diagram that represents a result of performing image conversion in order to extract the density of an edge for FIG. 5A. Each texture is expressed by a darker color as the density of the edge is higher. FIG. 5C shows a result of performing clustering jobs four times on FIG. 5B for the segmentation of a region of an image. As a result of performing the clustering jobs four times, it is possible to determine that it is optimal to segment the image in FIG. 5A into four clusters. FIG. 5D represents when the image in FIG. 5A is segmented into regions in which the density value of an edge converted into a log scale shows a difference equal to or greater than a threshold value.

In a case where edge density region values in each region in FIG. 5D are 90, 108, 120, and 153, respectively from a bright region to a dark region and the density region n of an edge is set to 5, a range [1.95 to 2.18] converted into a log scale is divided into five equal parts. Thus, regarding the converted density region of the edge, 90 is a first region, 108 is a second region, 120 is a third region, and 153 is a fifth region.

According to an embodiment, it is possible to express, by using haptic sensation, colors, textures or the like included in an image that is visual content.

The apparatus and method according to embodiments of the inventive concept may be implemented in the form of a program command that may be performed through various computer units, and recorded in computer readable media. The computer readable media may include a program command, data file, and data structure solely or in combination. The program command recorded in the computer readable media may be things specially designed and configured for the inventive concept or known to an ordinary person in the field of computer software to be capable of being used by him or her. Examples of the computer readable media include magnetic media, such as a hard disk, a floppy disk, and a magnetic tape, optical media, such as a compact disk read only memory (CD-ROM) and a digital versatile disc (DVD), magneto-optical media, such as a floptical disk, and a hardware device that is especially configured to store and execute a program command, such as a read only memory (ROM), a random access memory (RAM), and a flash memory. Examples of the program command include not only a machine code made by a compiler but also a high-level language code that may be executed by a computer by using an interpreter or the like.

The above-described hardware device may be configured to operate as one or more software modules to execute the operations of the inventive concept and vice versa.

The inventive concept has been described with reference to preferred embodiments thereof. It will be understood by a person skilled in the art that various changes in form may be made without departing from the essential feature of the inventive concept. Therefore, the disclosed embodiments should be considered in descriptive sense and not for purposes of limitation. The protective scope of the inventive concept is defined not by the detailed description but by the appended claims, and all differences within the equivalent scope will be construed as being included in the inventive concept.

What is claimed is:

1. A method of providing an image, the method comprising:
    obtaining an image;
    segmenting the obtained image into a plurality of regions by:
        converting the obtained image into an image expressing density of edges; and
        clustering the obtained image by texture based on the density of the edges,
    extracting a haptic feature from an edge in each of the plurality of regions of the obtained image;
    generating a vibration pattern signal corresponding to the extracted haptic feature based on vibration pattern data by converting a range of density values into a range of vibration values, wherein the range of vibration values is set based on a logarithmic scale of the range of density values; and
    generating vibration corresponding to a vibration generation request according to the generated vibration pattern signal in response to the vibration generation request.

2. The method of claim 1, wherein the extracting of the haptic feature from the edge of the obtained image comprises setting a coordinate system on the obtained image and extracting the haptic feature from a region of the obtained image corresponding to each coordinate of the set coordinate system.

3. The method of claim 1, wherein the vibration pattern data is a vibration pattern depending on at least one of a type of the haptic feature and a value of the haptic feature.

4. The method of claim 1, wherein the vibration pattern data comprises a vibration pattern that is generated through user cognition learning for the haptic feature.

5. The method of claim 1, further comprising displaying the obtained image on a display unit that recognizes a touch input, wherein the vibration generation request is performed in such a manner that a user touches a region of the image displayed on the display unit.

6. The method of claim 1, wherein the vibration values are amplitude values.

7. The method of claim 1, wherein the vibration values are frequency values.

8. The method of claim 1, wherein a waveform of the generated vibration is a sine wave when the converted density range is in an upper part of the density range, and the waveform is a square wave when the converted density range is in a lower part of the density range.

9. An apparatus for providing an image, the apparatus comprising:
    an image obtainment unit configured to obtain an image;
    an image region segmentation unit configured to segment the obtained image into a plurality of regions;
    a haptic feature extraction unit configured to extract a haptic feature from an edge in each of the plurality of regions of the obtained image;
    a vibration pattern signal generation unit configured to generate a vibration pattern signal corresponding to the extracted haptic feature by converting a range of edge density values of the image into a range of vibration values, wherein the range of vibration values is set based on a logarithmic scale of the range of density values; and
    a vibration generation unit configured to generate vibration corresponding to a vibration generation request according to the generated vibration pattern signal when the vibration generation request is obtained,
    wherein the image region segmentation unit is configured to convert the obtained image into an image expressing a density of an edge, and cluster the obtained image by a texture based on the density of the edge to segment the obtained image.

10. The apparatus of claim 9, wherein the haptic feature extraction unit is configured to set a coordinate system on the obtained image and extract the haptic feature from a region of the obtained image corresponding to each coordinate of the set coordinate system.

11. The apparatus of claim 9, further comprising a vibration generation request obtainment unit configured to obtain the vibration generation request, wherein the vibration generation request is a touch signal for any region of the obtained image.

* * * * *